(12) United States Patent
Elmar

(10) Patent No.: US 11,767,178 B2
(45) Date of Patent: Sep. 26, 2023

(54) GRIPPING DEVICE AS WELL AS TRANSPORT DEVICE FOR GRIPPING, HOLDING AND GUIDING IN PARTICULAR BOTTLE-LIKE CONTAINERS

(71) Applicant: TYROLON-SCHULNIG GMBH, Hochfilzen (AT)

(72) Inventor: Schulnig Elmar, St. Jakob i.H. (AT)

(73) Assignee: TYROLON-SCHULNIG GMBH, Hochfilzen (AT)

( * ) Notice: Subject to any disclaimer, the term of this patent is extended or adjusted under 35 U.S.C. 154(b) by 430 days.

(21) Appl. No.: 17/060,145

(22) Filed: Oct. 1, 2020

(65) Prior Publication Data
US 2021/0130110 A1 May 6, 2021

(30) Foreign Application Priority Data
Oct. 30, 2019 (EP) .................................... 19206187

(51) Int. Cl.
*B25J 15/04* (2006.01)
*B65G 47/86* (2006.01)
*F16F 1/06* (2006.01)
*H01F 7/00* (2006.01)

(52) U.S. Cl.
CPC ........ *B65G 47/847* (2013.01); *B25J 15/0475* (2013.01); *B65G 2201/0244* (2013.01); *F16F 1/06* (2013.01); *H01F 7/00* (2013.01)

(58) Field of Classification Search
CPC . B65G 47/847; B65G 2201/0244; F16F 1/06; B25J 15/0475

USPC .................................................. 294/106, 192
See application file for complete search history.

(56) References Cited

U.S. PATENT DOCUMENTS

| | | | | |
|---|---|---|---|---|
| 5,743,377 A | * | 4/1998 | Kronseder | ............ B67C 7/0053 198/470.1 |
| 5,893,700 A | * | 4/1999 | Kronseder | ................ B67C 3/24 414/744.2 |
| 8,128,142 B2 | * | 3/2012 | Glotzl | .................. B65G 47/847 294/99.1 |
| 8,556,062 B2 | * | 10/2013 | Stoiber | ................... B67C 3/242 198/470.1 |
| 9,102,479 B2 | * | 8/2015 | Schulnig | ............. B29C 45/0053 |
| 9,725,290 B2 | * | 8/2017 | Fahldiek | ............... B65G 47/847 |
| 11,352,219 B2 | * | 6/2022 | Elmar | .................. B65G 47/904 |
| 2011/0064555 A1 | | 3/2011 | Stoiber et al. | |

(Continued)

FOREIGN PATENT DOCUMENTS

| DE | 102014111338 A1 | 2/2016 |
|---|---|---|
| EP | 2774878 A1 | 9/2014 |
| EP | 2907777 A1 | 8/2015 |

*Primary Examiner* — Paul T Chin
(74) *Attorney, Agent, or Firm* — Shumaker, Loop & Kendrick, LLP; James D. Miller

(57) ABSTRACT

A gripping device for the gripping, holding and guiding of in particular bottle-like containers includes at least one gripper arm pair of a first gripper arm as well as a second gripper arm of complementary form to the first gripper arm, wherein the gripper arms each include a respective base body and gripping section; at least one spring for closing the gripper arm pair from an open position into a gripping position as well as at least one cam for opening the gripper arm pair from the gripping position into the open position. The at least one spring or the at least one cam is thereby arranged on the gripping device so as to be replaceable.

10 Claims, 2 Drawing Sheets

(56) References Cited

U.S. PATENT DOCUMENTS

| | | | |
|---|---|---|---|
| 2013/0193702 A1* | 8/2013 | Fahldieck | B65G 47/847 294/199 |
| 2015/0321858 A1* | 11/2015 | Fahldieck | B65G 47/90 294/192 |
| 2019/0291971 A1* | 9/2019 | Schulnig | B65G 47/847 |
| 2020/0039761 A1* | 2/2020 | Schulnig | B65G 47/847 |
| 2020/0071088 A1* | 3/2020 | Schulnig | B65G 47/847 |
| 2020/0191193 A1* | 6/2020 | Schulnig | B65G 47/90 |

* cited by examiner

GRIPPING DEVICE AS WELL AS TRANSPORT DEVICE FOR GRIPPING, HOLDING AND GUIDING IN PARTICULAR BOTTLE-LIKE CONTAINERS

CROSS-REFERENCE TO RELATED APPLICATION

This patent application is a United States Utility Patent Application which claims priority to European Patent Application No. 19 206 187.7 filed Oct. 30, 2019, the entire disclosure of which is hereby incorporated herein by reference.

FIELD OF THE INVENTION

The invention relates to a gripping device as well as a transport device for gripping, holding and guiding in particular bottle-like containers.

BACKGROUND OF THE INVENTION

Gripping devices for gripping, holding and/or guiding in particular substantially round containers are already known from the prior art and are used in the production line processing of such containers.

To be understood by the term container in the context of the present invention is in particular, albeit not exclusively, containers having a substantially circular cross section, e.g. bottles, cans or glassware, consisting of glass, metal or plastic according to the respective requirements. The term "substantially round" in the context of the present invention does not refer to round containers in the geometric sense exclusively, but also to e.g. oval, regularly polygonal, etc. ones which in particular exhibit a substantially circular, but for example also oval or polygonal cross section.

When being cleaned, filled or sealed, the containers are usually grasped at an entry point station by means of a gripping device having at least one pair of gripper arms and then transported to the next station within the process. Such a gripping device for a container transport system typically has at least two gripper arms and can switch between a gripping position and an open position. In order to transport a container, the gripper arms normally grasp below the neck collar or—in the case of bottles or other elongated containers—around the mid-section of the container.

As an example, a control cam thereby functions as an opening means and a spring as closing means for the gripping device. When the gripping device is thereby opened by the control cam, a force is applied against the inside of the gripper arm against the spring force. Thus, in other words, the control cam pushes the gripper arm pair apart against the spring force.

The spring force of the spring not only serves in closing the gripping device but also in the frictional holding of the container. The spring force is therefore configured accordingly.

Particularly when the container is to be grasped at the mid-section, the gripping device must be suited to firmly holding the container in a specific, in particular upright position. A high rotational speed of a transport device having for example a plurality of gripping devices arranged in particular in a circle imparts acceleration on particularly heavy and/or filled containers which, due to the container's shape and/or fill, can vary along the longitudinal axis of the container. Various strong forces can then be exerted on the gripping device due to this.

Furthermore, however, a container can also experience initial/final acceleration upon linear movement of the gripping device and thus exert forces on the gripping device.

Therefore, gripping sections of the gripper arms which fit precisely to the mid-section of the container and/or grasp the container at different points of its mid-section along the longitudinal axis of the container by means of multiple gripping section gripper fingers are typically utilized. A pivoting of the container about its longitudinal axis can thus be suppressed or the container's position respectively stabilized during transport.

Another aspect to the stable and secure bearing as well as the stable and secure transport of the container is that of applicably configuring the closing means in terms of its type and/or the closing force it is able to apply so as to adapt the gripping device to different types of containers and/or transport/processing conditions. However, this usually takes place in the course of manufacturing the gripping device, thus prior to being delivered to a customer. A subsequent adaptation, for example due to changing container sizes, is thereby associated with a large expenditure of time and cost due to the lengthy downtime of the gripping device.

This is the starting point of the invention. The task is thus based on specifying a gripping device as well as a transport device with which at least one closing means can be easily and quickly replaced.

SUMMARY OF THE INVENTION

With regard to the gripping device, the task is inventively solved by a gripping device as disclosed herein and shown in the drawings. With regard to the transport device, the task is inventively solved by a transport device as disclosed herein and shown in the drawings.

The advantages and preferential embodiments specified with regard to the gripping device apply analogously to the transport device and vice versa.

The task to which the gripping device is directed is specifically solved by a gripping device for the gripping, holding and guiding of in particular bottle-like containers, wherein the gripping device has at least one gripper arm pair comprising a first gripper arm as well as a second gripper arm of complementary form to the first gripper arm. The gripper arms thereby each comprise a respective base body and gripping section arranged on the respective base body. Complementary in the context of the present invention is hereby understood as the two gripping sections being geometrically designed so as to be substantially adapted to an outer contour of the in particular bottle-like container.

The gripping device furthermore comprises at least one closing means for closing the gripper arm pair from an open position into a gripping position. The gripping device furthermore likewise comprises at least one opening means for opening the gripper arm pair from the gripping position into the open position.

Further explanations as to the general structure of a gripping device are to be taken from e.g. DE 10 2014 111 564 A1 or EP 2 774 877 B1, both stemming from the applicant and to which reference is insofar made at this point, and both of which are entirely incorporated herein by reference.

According to the invention, the at least one closing means or the at least one opening means is arranged on the gripping device and particularly on the base body so as to be replaceable. To be understood by replaceable in the context of the present invention is the at least one closing means or the at least one opening means particularly being able to be easily removed from the gripping device without damage to the gripping device. The at least one closing means or the at least one opening means is thus in particular reversibly arranged on the gripping device; i.e. particularly no material or other type of connection only able to be disengaged by (partially) damaging at least one of the components (gripping device or the two base bodies) is for example provided between the at least one closing means or at least one opening means and the gripping device.

Replaceable is thereby to be further understood for example as the providing of multiple closing means or multiple opening means with respectively different parameters which are selectively fit on one and the same gripping device. In the context of the present invention, the different parameters can refer for example to mechanical properties, e.g. the magnitude of a closing or an opening force of the at least one closing means or the at least one opening means respectively.

This thereby enables the gripping device to be adapted in terms of a suitable closing or opening means, which will be explained in greater detail in the further course of the description, e.g. with respect to a customer-specific required closing or opening force. Thus, for example, gripping devices already in a customer's possession and in operation can also be easily adapted to changing conditions and, above all, quickly and with little effort.

On the other hand, a simple and quick replacement is enabled upon for example breakage or wear of the at least one closing means or at least one opening means.

In one embodiment, the at least one closing means or the at least one opening means is designed as a spring and in particular as a torsion spring comprising a first and a second leg. One leg each is thereby preferentially arranged on one of the respective base bodies of the gripper arms so that a closing (in the case of the closing means) or an opening (in the case of the opening means) of the gripper arm pair is thereby realized by the spring. Springs and in particular torsion springs have proven advantageous as closing means/opening means. They are furthermore economically available on the free market in virtually all geometrical configurations and also with differing spring constants. Should the spring serve as opening means, the control cam—in contrast to the initially described embodiment—serves as closing means.

According to an alternative embodiment, the at least one closing means or the at least one opening means is designed as a pair of magnets comprising a first magnet and a second magnet. Analogously to the aforesaid legs, one magnet each is thereby arranged on a respective base body of the gripper arms so as to enable a reliable closing of the gripper arm pair to be realized when the closing means is designed as a pair of magnets and, similarly, a reliable opening when the at least one opening means is designed as a pair of magnets and thus a moving of the gripper arm pair into the open position. One design to the at least one opening means as a magnet pair is indicated for example in EP 2 769 941 A1, which stems from the applicant and to which reference is insofar made at this point, and is entirely incorporated herein by reference. In this case as well, the aforesaid control cam then serves as closing means.

Further self-explanatory is the magnet pair designed as a closing means being an attracting pair of magnets and the magnet pair designed as an opening means being a repelling pair of magnets.

Magnets and especially magnet pairs have also proven suitable as closing means/opening means.

The selectively replaceable design of the at least one closing means or the at least one opening means thus enables easy and economical adaptation of the gripping device to customer needs or geometrical requirements.

Particularly preferential is for the at least one closing means or the at least one opening means to be arranged on the respective gripper arm base body so as to be able to be replaced without tools. Tool-free in the context of the present invention refers to the at least one closing means or the at least one opening means preferably being able to be replaced without any special or heavy tools such as e.g. special pliers or wrenches. To put it simply, the at least one closing means or the at least one opening means can thus preferably be replaced using just a standard tool such as e.g. a simple screwdriver or particularly even "by hand" without any tool at all. This optimizes the aforesaid simple replacement of the at least one closing means or the at least one opening means and moreover optimizes the aforesaid saving of time during replacement.

In one embodiment, the at least one closing means or the at least one opening means is arranged and especially seatable on an upper side of the gripping device and in particular on an upper side of the respective base body. Further preferential is for the at least one closing means or the at least one opening means to be arranged on the upper side of the gripping device and in particular on an upper side of the respective base body so as to be exposed. In the context of the present invention, exposed is to be understood as the at least one closing means or the at least one opening means not being covered or concealed by other components of the gripping device but rather readily accessible.

This thereby realizes easy access to the at least one closing means or the at least one opening means, which further simplifies and optimizes the replaceability of the least one closing means or the least one opening means. For example, there is no component covering the at least one closing means or the at least one opening means which first needs to be removed.

The base body expediently comprises at least one respective seating for the at least one closing means or the at least one opening means. When the closing means or the at least one opening means is a spring, the seating is for example in the form of a pin into which an end of a respective leg of the spring preferentially configured as an eyelet can be fit. When the at least one closing means or the at least one opening means is a magnet pair, the at least one seating is for example configured as a hole into which a pin formed or arranged on each of the first and second magnets of the magnet pair can be inserted.

Alternatively or additionally, the seating can be configured such that it can serve to accommodate both a closing means or opening means designed as a spring or as a pair of magnets.

The design of the at least one seating thus takes into account the different and previously noted configurations of the at least one closing means or the at least one opening means to the effect of the gripping device being configurable to the respective requirements.

The task to which the transport device is directed is specifically solved by a transport device having at least one gripping device of the type described above. A plurality of gripping devices are thereby preferably arranged in a circumferential direction of the transport device, which is preferably of circular design. The gripper arms are thereby arranged on the transport device such that the gripping sections are directed radially outwardly. Due to the resulting shape of the transport device, it is also referred to as a transport star.

BRIEF DESCRIPTION OF THE DRAWINGS

Example embodiments of the invention are described in greater detail below on the basis of the figures. These show, to some extent in highly simplified representations.

DETAILED DESCRIPTION OF THE INVENTION

Figure 1A:
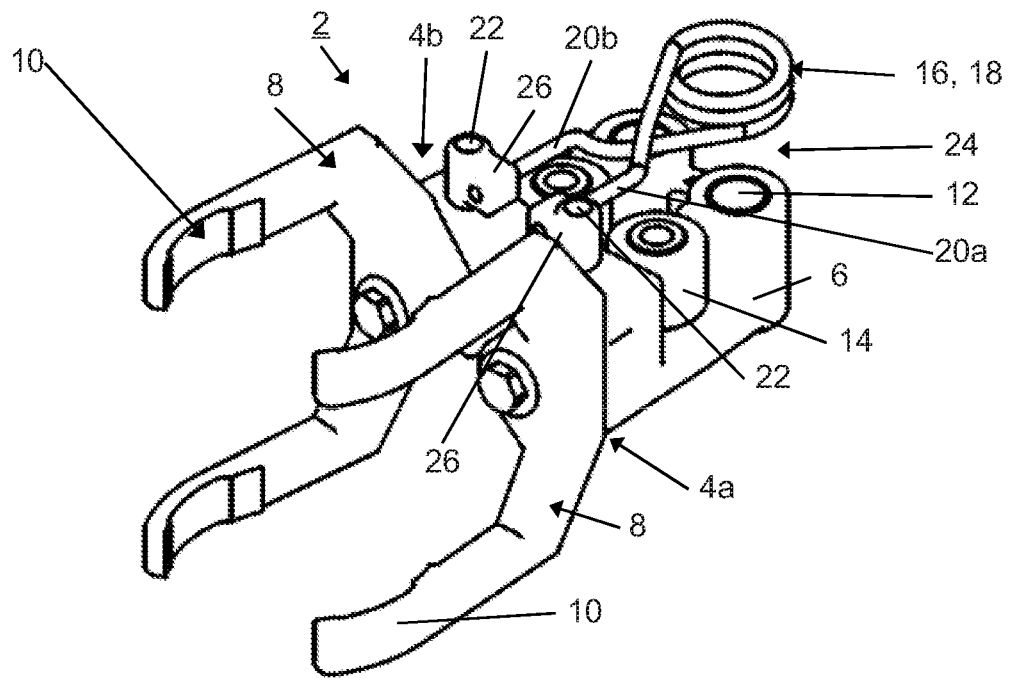
FIG. 1A is a perspective view of an inventive gripping device comprising a closing means according to a first embodiment.

In the figures, components rendering the same effect are always depicted with the same reference numerals.

The gripping device 2 shown in FIG. 1A is designed for the gripping, holding and guiding of in particular bottle-like containers (not shown). To that end, the gripping device 2 in the first embodiment shown in FIG. 1A exhibits a gripper arm pair comprising a first gripper arm 4a and a second gripper arm 4b. The second gripper arm 4b is of complementary design to the first gripper arm 4a; i.e. the two gripper arms 4a, 4b are designed so as to be able to grasp, hold and guide a peripheral contour of a bottle-like container. FIG. 1A shows the gripping device 2 in a gripping position.

The two gripper arms 4a, 4b each exhibit a base body 6 as well as a gripping section 8. The gripping section 8 is arranged on the base body 6 and essentially designed like a fork; i.e. the gripping section 8 has at least two gripper fingers 10. The gripping section 8 can moreover also be arranged on the base body 6 so as to be pivotable about a pivot axis (not shown) in and opposite a direction of pivot.

The gripping section 8 is preferably integrally formed; i.e. monolithic, and comprises plastic. The gripping section 8 is especially made from plastic, e.g. a fiber-reinforced polyether ether ketone.

The gripping device 2 further comprises at least one (not shown) bearing unit serving to support the gripper arms 4a, 4b. To that end, the bearing unit has two bearing pins and a bearing body (not shown). The bearing pins serve to accommodate the gripper arms 4a, 4b and in particular the base body 6. To that end, a respective base body 6 has a bore hole 12 into which the bearing pins are inserted. The base bodies 6 are thereby rotatably mounted on the bearing pin.

To move the gripper arm pair from the gripping position into an open position, a control cam (not shown) is provided which is operatively connected to at least one actuating roller 14 of each gripper arm 4a, 4b. In other words, the control cam presses against the actuating rollers 14 of the gripper arms 4a, 4b and thus pushes them apart into the open position. For this reason, the control cam is also referred as opening means.

In order to again move the gripper arms 4a, 4b from the open position into the gripping position, the gripping device 2 comprises at least one closing means 16. The exemplary embodiment according to FIG. 1A shows exactly one closing means 16 as per a first embodiment. The closing means 16 is designed here as a spring 18, particularly as a torsion spring with two legs 20a, 20b. Each respective leg 20a, 20b is arranged on a base body 6 of the gripping device 2. To that end, the base body 6 exhibits at least one seating 22 for the closing means 16 and particularly for the two legs 20a, 20b. The seating 22 in the exemplary embodiment according to FIG. 1A is of pin-like form. The seating 22 is arranged on an upper side 24 of the base body 6, which makes for advantageous accessibility to the closing means 16.

The spring 18 is designed so as to exert a spring force on the gripper arms 4a, 4b when same are in the open position. In other words, the spring 18 is designed such that it presses the two gripper arms 4a, 4b together and thus moves same from the open position into the gripping position. The spring force does not thereby solely serve a move into the gripping position. Rather, it also serves to apply a retaining force to a container gripped between the gripping sections 8 and is therefore configured accordingly in terms of magnitude.

The inventive concept is explained in greater below on the basis of the closing means 16. However, that as specified below also applies equally to a feasible configuration of the opening means.

According to the invention, the closing means 16 designed as spring 18 as per FIG. 1A is arranged on the gripping device 2 and particularly on the base bodies 6 so as to be replaceable, and in particular replaceable without tools. To that end, the closing means 16 exhibits for example eyelet-like retaining means 26 by which it is fit onto the pin-like seatings 22. This configuration has proven advantageous in terms of a tool-free and replaceable as well as a concurrently secure arrangement of the closing means 16. Tool-free and replaceable is thereby to be understood as no tool being necessary to replace the closing means 16 and it moreover being able to be removed or mounted easily and without any damage to the gripping device 2.

Figure 1B:
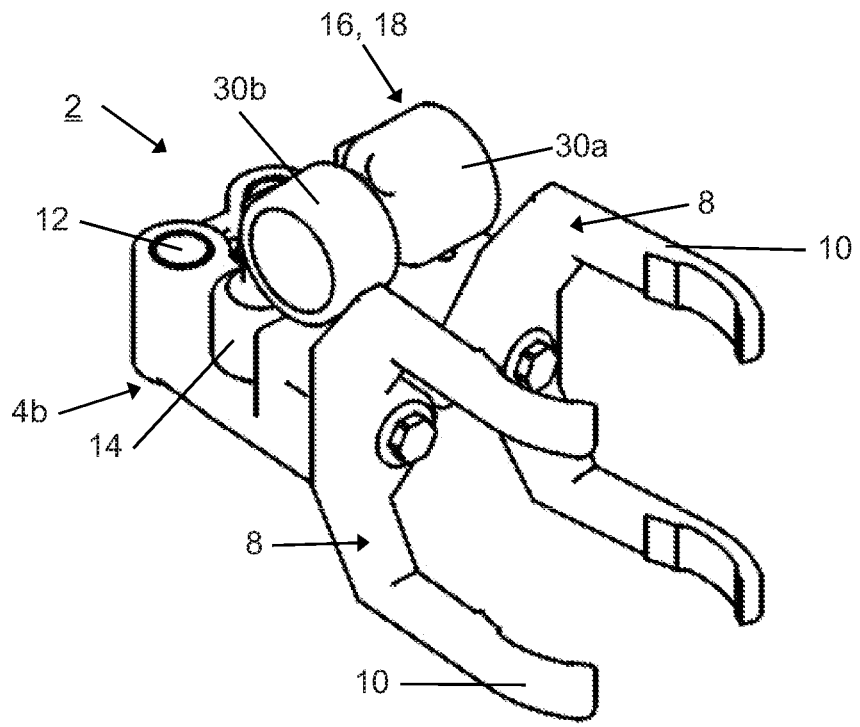
FIG. 1B is a perspective view of the inventive gripping device comprising a closing means according to a second embodiment.

FIG. 1B shows a gripping device 2 comprising a closing means 16 according to a second embodiment. The gripping device 2 according to FIG. 1B substantially corresponds to the gripping device 2 according to FIG. 1A, which is why the following only addresses the differences.

This consists of the closing means 16 in this embodiment being configured as a pair of magnets 28. The magnet pair 28 comprises a first magnet 30a arranged on the base body 6 of the first gripper arm 4a. The magnet pair 28 furthermore comprises a second magnet 30b arranged on the base body 6 of the second gripper arm 4b.

In this embodiment shown, the magnet pair 28 is designed as an attracting magnet pair 28; i.e. the two magnets 30a, 30b attract each other which, when the gripping device 2 in the open position, in particular results in a reliable moving into the gripping position (depicted in FIG. 1B). Analogously to the configuration of the closing means 16 as a spring 18 (cf. FIG. 1A), the attractive force of the magnet pair 28 is likewise accordingly configured so as to also ensure a secure holding of a gripped container.

The two magnets 30a, 30b are furthermore preferentially arranged on the upper side 24 of the base body 6 so as to be inserted into a (concealed) opening in the middle of the actuating rollers 14. To that end, the magnets 30a, 30b are preferably shaped like pins (likewise not visible).

The closing means 16 configured as a magnet pair 28 according to FIG. 1B is likewise arranged so as to be replaceable without tools, which enables a simple and quick change or replacement of the closing means. Replacement of the closing means can thereby be understood to mean simply the disposing of a closing means having different parameters; i.e. a different closing force, for example. The type of closing means (magnet pair or spring) does not, however, change.

Changing the closing means 16 can thereby be understood to mean changing the type of closing means. For example, a closing means 16 designed as a magnet pair 28 is thereby replaced by a closing means 16 designed as a spring 18 or vice versa. The gripping device 2 and particularly the base bodies 6 are thereby of modular design, thus to accommodate both closing means 16 variants. Consequently, it is for example furthermore possible to arrive at the embodiment according to FIG. 1B from the embodiment according to FIG. 1A simply by changing the closing means 16.

The tool-free and replaceable arrangement of the differently designed closing means 16 thus enables the gripping device 2 to be adaptable to different customer needs and technical requirements, whereby essentially one and the same base body 6 is always used, which, on the one hand, significantly simplifies production in terms of costs and effort. On the other hand, gripping devices 2 already in operation can furthermore be easily adapted to changing requirements or circumstances. Additionally, the tool-free replaceability significantly reduces the downtime of the gripping device 2 since the closing means 16 can be easily and quickly replaced "by hand."

Alternatively, the above-described embodiments of the closing means 16 as a magnet pair 28 or as a spring 18 are also applicable—as already mentioned at the outset—to an embodiment of the (not shown) opening means such that the above implementations and advantages of the replaceable closing means 16 are also analogously applicable to embodiments of the opening means.

Figure 2A:
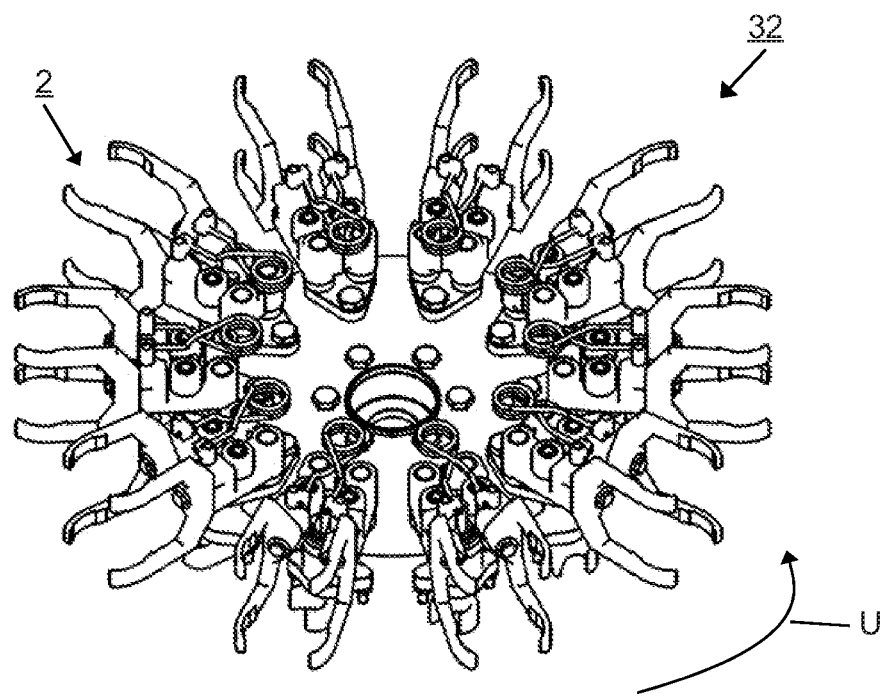
FIG. 2A is a perspective view of an inventive transport device according to a first embodiment, as well as FIG. 2B is a perspective view of an inventive transport device according to a second embodiment.

FIG. 2A shows a transport device 32 according to a first embodiment. The transport device 32 thereby comprises gripping devices 2 pursuant to the first embodiment (cf. FIG. 1A) arranged in a circumferential direction U. That is to say that the gripping devices 2, specifically the ten gripping devices 2, of transport device 32 according to FIG. 2A exhibit a closing means 16 designed as a spring 18.

The gripping devices 2 are furthermore arranged on the transport device 32 such that the gripping sections 8 are directed radially outwardly in order to grasp, hold and guide the in particular bottle-like containers (not shown) during the operation of the transport device 32.

Figure 2B:
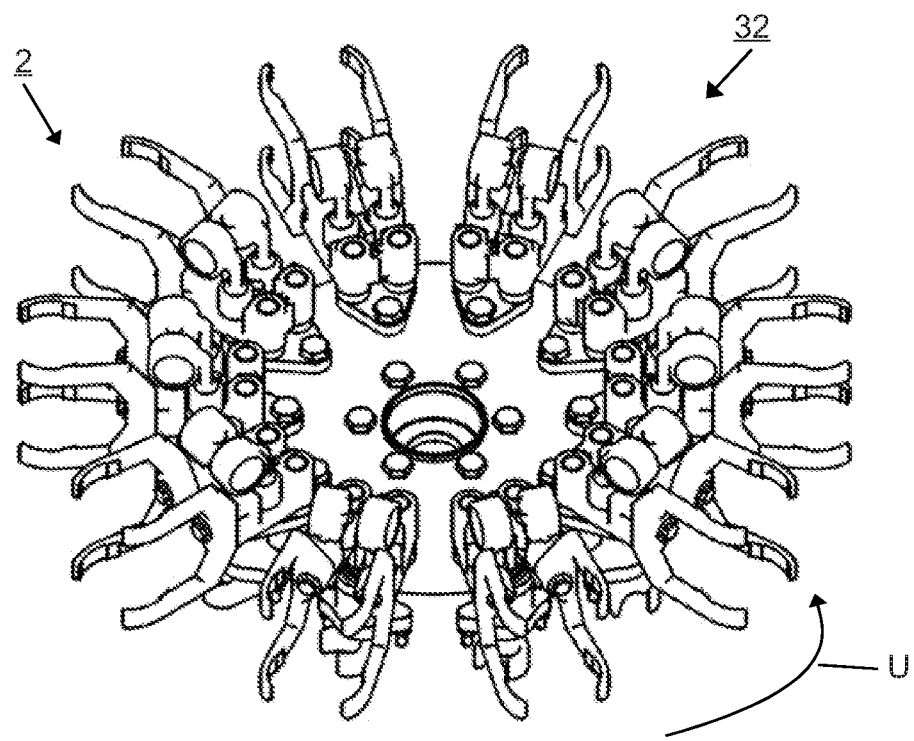

FIG. 2B depicts a transport device 32 according to a second embodiment. The transport device 32 according to the second embodiment essentially corresponds to the transport device 32 shown in FIG. 2A. It likewise exhibits multiple, specifically ten, gripping devices 2 arranged on the transport device 32 in circum-ferential direction U. The closing means 16 in the transport device 32 according to the second embodiment, however, is configured as a magnet pair 28.

The invention is not limited to the exemplary embodiments described above. Rather, one skilled in the art can also derive other variants of the invention therefrom without departing from the subject matter of the invention. In particular, all the individual features described in conjunction with the exemplary embodiments can also be combined in other ways without departing from the subject matter of the invention.

LIST OF REFERENCE NUMERALS 2 gripping device
4a first gripper arm
4b second gripper arm
6 base body
8 gripping section
10 gripper finger
12 bore hole
14 actuating roller
16 closing means
18 spring
20a,b leg of spring
22 seating
24 upper side
26 eyelet-like retaining means
28 magnet pair
30a first magnet
30b second magnet
32 transport device
U circumferential direction

What is claimed is:

1. A gripping device for gripping, holding and guiding bottle-like containers, the gripping device comprising:
   at least one gripper arm pair of a first gripper arm as well as a second gripper arm of complementary form to the first gripper arm, wherein the gripper arms each comprise a respective base body and gripping section;
   at least one closing means for closing the gripper arm pair from an open position into a gripping position; and
   at least one opening means for opening the gripper arm pair from the gripping position into the open position, wherein the at least one closing means or the at least one opening means is arranged on the gripping device so as to be replaceable, wherein the at least one closing means or the at least one opening means is arranged so as to be able to be replaced without tools.

2. The gripping device according to claim 1, wherein the at least one closing means or the at least one opening means is a spring.

3. The gripping device according to claim 2, wherein the at least one closing means or the at least one opening means is a torsion spring.

4. The gripping device according to claim 1, wherein the at least one closing means or the at least one opening means is a magnet pair.

5. The gripping device according to claim 4, wherein the magnet pair further comprises a first magnet and a second magnet.

6. The gripping device according to claim 1, wherein the at least one closing means or the at least one opening means is arranged on an upper side of the gripping device, in particular the base body.

7. The gripping device according to claim 6, wherein the at least one closing means or the at least one opening means is arranged on the base body.

8. The gripping device according to claim 1, wherein the at least one closing means or the at least one opening means is arranged on the gripping device so as to be exposed.

9. The gripping device according to claim 1, wherein the base body further comprises at least one respective seating for the at least one closing means or the at least one opening means.

10. A transport device for gripping, holding and guiding bottle-like containers, wherein the gripping device of claim 1, is arranged in a circumferential direction of the transport device such that the at least one gripper arm pair of the gripping device is directed radially outwardly.

* * * * *